United States Patent
Hoppe et al.

(10) Patent No.: US 12,263,830 B2
(45) Date of Patent: Apr. 1, 2025

(54) METHOD FOR CONTROLLING AN AIR CONDITIONING COMPRESSOR IN A HYBRID POWERTRAIN, AND HYBRID POWERTRAIN

(71) Applicant: Schaeffler Technologies AG & Co. KG, Herzogenaurach (DE)

(72) Inventors: Marcus Hoppe, Achern (DE); Torsten Pieper, Weingarten (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 131 days.

(21) Appl. No.: 17/920,083

(22) PCT Filed: Apr. 1, 2021

(86) PCT No.: PCT/DE2021/100318
§ 371 (c)(1),
(2) Date: Oct. 20, 2022

(87) PCT Pub. No.: WO2021/219160
PCT Pub. Date: Nov. 4, 2021

(65) Prior Publication Data
US 2023/0219556 A1 Jul. 13, 2023

(30) Foreign Application Priority Data
Apr. 27, 2020 (DE) .................. 10 2020 111 421.4

(51) Int. Cl.
*B60W 10/08* (2006.01)
*B60H 1/00* (2006.01)
(Continued)

(52) U.S. Cl.
CPC .......... *B60W 20/15* (2016.01); *B60H 1/00392* (2013.01); *B60H 1/00428* (2013.01);
(Continued)

(58) Field of Classification Search
CPC ....... B60L 50/16; B60W 10/08; B60W 10/30; B60W 20/00; B60W 20/15; B60W 50/0205; B60H 1/00392; B60H 1/00428
See application file for complete search history.

(56) References Cited

U.S. PATENT DOCUMENTS 6,729,998 B2 * 5/2004 Egami .................... F02N 11/04
62/133
8,597,146 B2 * 12/2013 Holmes .................. F16H 3/728
475/5

(Continued)

FOREIGN PATENT DOCUMENTS

CN 204488420 U 7/2015
CN 105313667 A 2/2016
(Continued)

*Primary Examiner* — Gonzalo Laguarda

(57) ABSTRACT

A method is provided for controlling an air conditioning compressor in a hybrid powertrain of a motor vehicle. The hybrid powertrain includes an internal combustion engine, a first electric machine, and a second electric machine electric machines and the internal combustion engine are selectively connected to the air conditioning compressor so as to function as a drive of the air conditioning compressor. At least one of the first electric second electric machine, or the internal combustion engine is selected as the drive is selected based on a selection by an occupant of the motor vehicle. The selected drive is actuated to drive the air conditioning compressor.

18 Claims, 3 Drawing Sheets

(51) Int. Cl.
*B60W 10/30* (2006.01)
*B60W 20/15* (2016.01)
*B60W 50/02* (2012.01)
*B60L 50/16* (2019.01)

(52) U.S. Cl.
CPC ............ *B60W 10/08* (2013.01); *B60W 10/30* (2013.01); *B60W 50/0205* (2013.01); *B60L 50/16* (2019.02)

(56) References Cited

U.S. PATENT DOCUMENTS

| | | | | |
|---|---|---|---|---|
| 8,647,230 | B2* | 2/2014 | Akutsu | B60L 50/16 477/4 |
| 8,770,327 | B2* | 7/2014 | Yamada | B60K 6/383 180/65.22 |
| 10,124,647 | B2* | 11/2018 | Bidner | B60H 1/00271 |
| 10,124,785 | B2* | 11/2018 | Books | B60R 16/0236 |
| 2012/0253576 | A1* | 10/2012 | Tamagawa | B60W 10/08 180/65.265 |
| 2012/0266701 | A1* | 10/2012 | Yamada | G16Z 99/00 180/65.265 |
| 2016/0114652 | A1 | 4/2016 | Izumi et al. | |
| 2016/0193991 | A1 | 7/2016 | Apelsmeier | |

FOREIGN PATENT DOCUMENTS

| | | | | |
|---|---|---|---|---|
| CN | 105593092 | A | 5/2016 | |
| DE | 10346974 | A1 | 4/2004 | |
| DE | 102004044134 | A1 * | 3/2006 | ......... B60H 1/00978 |
| DE | 102007030539 | A1 | 1/2009 | |
| DE | 102010024165 | A1 | 3/2011 | |
| DE | 102014016172 | A1 | 5/2016 | |
| DE | 102016204939 | A1 | 9/2017 | |
| DE | 102018111151 | A1 | 11/2019 | |
| DE | 102019115444 | A1 | 6/2020 | |
| DE | 102019 31956 | A1 | 10/2020 | |
| DE | 102019131956 | A1 | 10/2020 | |
| DE | 102019117758 | A1 | 1/2021 | |
| DE | 102019120145 | A1 | 1/2021 | |
| WO | 2014029651 | A1 | 2/2014 | |
| WO | 2021083449 | A1 | 5/2021 | |

* cited by examiner

METHOD FOR CONTROLLING AN AIR CONDITIONING COMPRESSOR IN A HYBRID POWERTRAIN, AND HYBRID POWERTRAIN

CROSS-REFERENCE TO RELATED APPLICATIONS

This application is the U.S. National Phase of PCT Appln. No. PCT/DE2021/100318 filed Apr. 1, 2021, which claims priority to DE 102020111421.4 filed Apr. 27, 2020, the entire disclosures of which are incorporated by reference herein.

TECHNICAL FIELD

The disclosure relates to a method for controlling an air conditioning compressor in a hybrid powertrain of a motor vehicle and to a hybrid powertrain comprising an internal combustion engine and a first electric machine as well as a second electric machine, preferably an electric machine which is operated as a generator, wherein each of the electric machines and/or the internal combustion engine can be operatively connected to the air conditioning compressor so as to function as the drive of the air conditioning compressor.

BACKGROUND

The publications DE 10 2018 111 151 A1 and DE 10 2010 024 165 A1 show, by way of example, air conditioning compressors of an air conditioning system in a hybrid powertrain that can be operated by means of an electric machine.

SUMMARY

The disclosure, according to an exemplary embodiment, provides further development of a hybrid powertrain and a method for controlling an air conditioning compressor in a hybrid powertrain.

The disclosed method is used to control an air conditioning compressor in a hybrid powertrain of a motor vehicle having a drive unit comprising an internal combustion engine and a first electric machine as well as a second electric machine, which can be operated as a generator, wherein each of the electric machines and/or the internal combustion engine can be operatively connected to the air conditioning compressor so as to function as the drive of the air conditioning compressor. This means that, depending on the desired operating situation of the air conditioning compressor or the motor vehicle, the air conditioning compressor is driven, for example, by means of a correspondingly designed and controlled switching device, by the first electric machine, for example, used exclusively to propel the motor vehicle and/or to recover kinetic energy of the motor vehicle, by the second electric machine, for example, used as a generator, as a starter of the internal combustion engine and alternatively as a means of driving the motor vehicle, for example, an electric machine that is arranged in a belt pulley plane, and/or by the internal combustion engine. The drive is selected depending on a desired air conditioning selected by occupants of the motor vehicle.

In addition, the drive can be selected depending on an operating mode of the hybrid powertrain or the motor vehicle, for example, depending on a desired driver torque, which is determined, for example, depending on a position of an accelerator pedal.

For example, when the hybrid powertrain is operated exclusively electrically in a first drive type of the drive, the second electric machine and the air conditioning compressor can be decoupled from the hybrid powertrain and the second electric machine can be used exclusively to drive the air conditioning compressor.

For example, when the hybrid powertrain is operated exclusively electrically in a second drive type of the drive, the first and/or second electric machine can serve to drive the air conditioning compressor.

For example, between the two types of drive, depending on the power required for the air conditioning compressor, a load requirement on the hybrid powertrain, and/or determined operating points of characteristic curves of the electric machine and/or the air conditioning compressor can be selected.

For example, when a load requirement on the hybrid powertrain exceeds a predetermined threshold, the air conditioning compressor can be switched off for the duration of this load requirement.

For example, the air conditioning compressor can be switched off when a malfunction of the air conditioning compressor is determined. In this case, a malfunction can be determined, for example, depending on the pressure applied to the air conditioning compressor. Alternatively, or in addition, a malfunction can be determined by comparing a torque development of the hybrid powertrain with and without a coupled air conditioning compressor.

Further, a hybrid powertrain, containing an internal combustion engine, a first electric machine as well as a second electric machine which can be operated as a generator, an air conditioning compressor for an air conditioning system, and at least one control unit controlling the air conditioning compressor, wherein the air conditioning compressor is connected to the second electric machine in a rotationally locked manner and is designed to be connectable to the internal combustion engine and the first electric machine, for example, by means of a switching device. A routine for carrying out the proposed method is implemented in the at least one control unit.

In other words, in order to reduce the cost and to improve the efficiency of an air conditioning system having an air conditioning compressor as well as the overall energy balance of motor vehicles with a hybrid powertrain, the air conditioning compressor is driven by means of several drive sources, for example, the second electric machine, e.g., provided as a generator, the first electric machine and/or the internal combustion engine provided.

In this case, the driving mode, like the operating mode of the motor vehicle, is selected depending on the desired air conditioning by means of the two electric machines and/or the internal combustion engine.

In this case, the air conditioning compressor can be driven in serial mode by the internal combustion engine or by the second electric machine, regardless of the vehicle speed. Alternatively, the air conditioning compressor can be driven by the first electric machine depending on the vehicle speed.

Furthermore, when the motor vehicle is driven exclusively by means of the internal combustion engine, the air conditioning compressor can be driven by the internal combustion engine depending on the vehicle speed. It goes without saying that the rotational speed of the internal combustion engine and the vehicle travel speed may depend on a ratio of a fixed or selected gear ratio of a set fixed gear ratio or a transmission with several gear ratios, and the air conditioning compressor is driven at a speed dependent on this. A serial mode, such as serial driving, is to be understood as meaning the operation of the motor vehicle by the first electric machine operated as a traction motor with the internal combustion engine driving the second electric machine.

When the motor vehicle is driven in hybrid mode, in purely electric mode or only by means of the internal combustion engine, the drive of the air conditioning compressor can be made dependent on the desired air conditioning selected by the occupants of the motor vehicle and/or other influencing variables such as the outside temperature, the vehicle speed, a battery charge status, an accelerator pedal position and/or the like.

The selection of the operating modes of the drive of the motor vehicle and the operating mode dependent thereon, such as driving the air conditioning compressor, can be carried out by means of a switching device having clutches such as switching clutches corresponding to gear switching mechanisms of manual transmissions. For example, when driving electrically, i.e., when the internal combustion engine is switched off, a boost effect can be achieved by means of the second electric machine. In this case, the first electric machine and the air conditioning compressor are decoupled from the vehicle speed by means of the switching device between the belt pulley plane and the drive unit consisting of the internal combustion engine and the first electric machine. In an operating mode of the air conditioning compressor, such as driving the air conditioning compressor when the first and second electric machines are coupled to one another, the rotational speed of the air conditioning compressor is dependent on the vehicle speed.

If the motor vehicle is operated exclusively electrically, the power for the air conditioning compressor can be provided by the first electric machine. In this case, the speed of the air conditioning compressor is dependent on a preset ratio of the first electric machine and the wheel rotation speeds of drive wheels of the motor vehicle. Depending on the arrangement of these, for example, integrated into a transmission, a rotational speed difference can be set between the air conditioning compressor and the rotor of the first electric machine, for example, from an engaged or fixed set ratio.

On the other hand, when the air conditioning compressor is driven by the second electric machine, the switching device between the second electric machine and the air conditioning compressor on the one hand and the first electric machine on the other can be opened so that the air conditioning compressor can be operated independently of the wheel speed.

The corresponding drive variables can be selected depending on an overall consideration of the power required at the drive wheels and at the air conditioning compressor. For example, the current operating points of characteristic diagrams of the first and second electric machines and of the air conditioning compressor can be used for this purpose.

For example, it can be more efficient to shift the load point on the first electric machine by means of a load set on the air conditioning compressor and thus create a speed dependency on the wheel speeds when the switching device is closed between the air conditioning compressor and the first electric machine than to drive the air conditioning compressor exclusively by means of the second electric machine. Alternatively, in other operating situations, for example, the air conditioning compressor can be controlled under the primacy of the characteristic diagram of the air conditioning compressor by the second electric machine being operated independently of the wheel speed when the load on the air conditioning compressor is low.

For example, when there is a maximum load requirement on the drive wheels, for example, when the accelerator pedal is fully actuated, the air conditioning compressor can be switched off briefly in order to be able to use the available power of the drives, for example, the first and second electric machines and/or the internal combustion engine, completely for propelling the motor vehicle.

For example, boost operation can be provided with both electric machines. This mode can be provided, for example, in the case of high torque requirements, for example, drive wheels present on curbs, parking garage ramps and/or the like. The air conditioning compressor can be switched off, for example, by appropriately adjusting the swash plates of the air conditioning compressor.

For example, a protective device for the hybrid powertrain can be provided in the event of a malfunction in the air conditioning compressor. For example, a lack of coolant in the air conditioning system can lead to a seizing, i.e., blocking of the air conditioning compressor. For example, in the case of an air conditioning compressor integrated into a transmission of the hybrid powertrain, a malfunction can lead to the transmission locking and thus to increased consequential damage.

A malfunction of the air conditioning compressor can be determined, for example, by measuring the pressure of the coolant in the air conditioning system. If, for example, the pressure in the air conditioning system decreases, either an existing magnetic clutch can be opened or, if a swash plate is present instead of the magnetic clutch, this can be brought into the "open" position. This means that existing air conditioning compressor pistons do not perform a stroke when the rotational speed is applied.

Alternatively, or additionally, a malfunction in the air conditioning system can be detected by means of a torque comparison in the powertrain. If, for example, a sudden increase in torque is detected in the hybrid powertrain, the air conditioning compressor is decoupled from the hybrid powertrain for safety reasons, for example, by means of a magnetic clutch or switching of the swash plates.

After this emergency opening has taken place, the plausibility of the functional impairment is verified by the air conditioning compressor based on the torque development in the hybrid powertrain. The following procedure can be provided for this:

gradual recoupling of the air conditioning compressor with the hybrid powertrain,
 comparison of the expected drive torque (depending on vehicle speed, gradient, accelerator pedal position and the like) with the expected additional torque for the set cooling capacity,
 if the torque is higher than the expected value, repeat the emergency opening and reconnect the air conditioning compressor,
 if a malfunction is still detected after repeated reconnection, the air conditioning compressor or the air conditioning system is switched off completely and an error message is displayed for the driver on the dashboard,
 if the torque measured during recoupling matches the expected value, the air conditioning compressor continues to operate normally and the sudden increase in torque was a temporary disturbance.

BRIEF DESCRIPTION OF THE DRAWINGS

The disclosure is explained in more detail with reference to the exemplary embodiment shown in FIGS. 1 to 4. In the figures.

DETAILED DESCRIPTION

Figure 1:
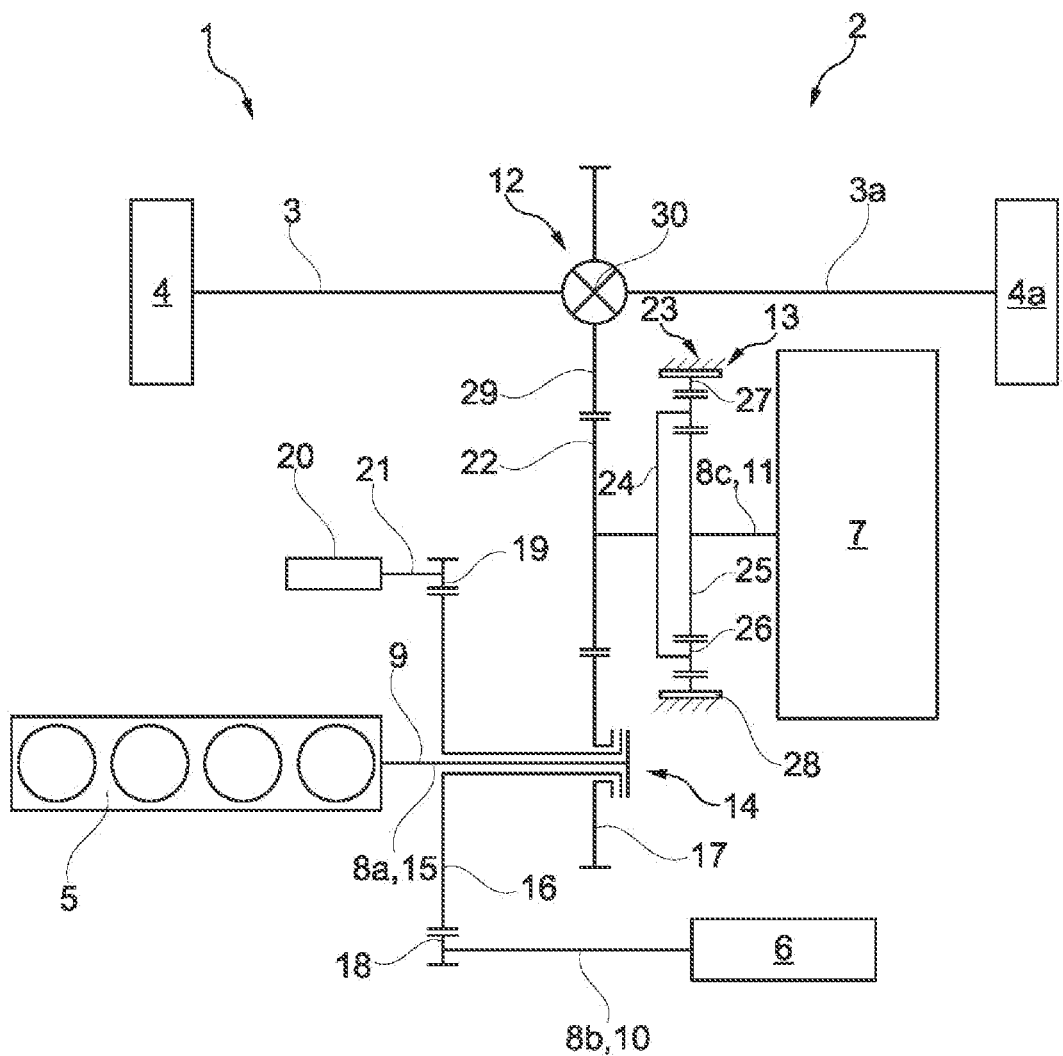
FIG. 1 shows a schematic representation of a hybrid powertrain of a motor vehicle having an air conditioning compressor.

FIG. 1 shows a serial hybrid powertrain 1 for carrying out the proposed method in a schematic representation, which is integrated in a motor vehicle 2 and which drives the motor vehicle 2 electrically, in a hybrid manner or exclusively by means of an internal combustion engine 5. For this purpose, drive wheels 4, 4a of a front or rear axle are driven by the internal combustion engine 5 and/or one or both electric machines 6, 7 by means of drive axles 3, 3a.

The first electric machine 7 can be used as a traction motor and the second electric machine 6 can be used as a generator for charging an accumulator and for driving auxiliary units. In addition, the second electric machine 6 can be designed to be switchable as a drive motor, for example for electric reversing.

The two electric machines 6, 7 are arranged to be offset to one another in the radial direction by means of the axes of rotation 8b, 8c of their rotor shafts 10, 11. The second electric machine 6 comprises the rotor shaft 10 which is rotatably mounted about the axis of rotation 8b. The two electric machines 6, 7 are arranged to be radially offset relative to the first axis of rotation 8a of the output shaft 9 of the internal combustion engine 5.

In order to set the different operating states of the hybrid powertrain 1 described below, a transmission device 13, designed as a manual transmission, is provided between the internal combustion engine 5, in particular the output shaft 9, the two electric machines 6, 7 with their two rotor shafts 10, 11 and a drive section 12 of the hybrid powertrain 1. The transmission device 13 contains a switching device 14, which sets the specified operating states of the hybrid powertrain 1 depending on switching commands provided from a higher-level control unit.

The transmission device 13 has the centrally arranged intermediate shaft 15, which is coupled to the output shaft 9 in a rotationally fixed manner or is formed directly by a region of the output shaft 9, for example, integrally with the output shaft 9. The intermediate shaft 15 is arranged coaxially with the output shaft 9 and thus rotatable about the common first axis of rotation 8a.

The transmission device 13 has a first gear wheel 16 which is permanently connected/coupled to the first rotor shaft 10 in a rotationally fixed manner. The first gear wheel 16 is arranged coaxially to the intermediate shaft 15. The first gear wheel 16 is arranged on a hollow shaft and is mounted such that it can rotate about the intermediate shaft 15. Furthermore, the transmission device 13 has a second gear wheel 17 which, like the first gear wheel 16, is arranged coaxially to the intermediate shaft 15 on a hollow shaft such that it can rotate around the intermediate shaft 15 and the hollow shaft of the gear wheel 16.

The gear wheel 16 meshes with a gear wheel 18 of the rotor shaft 10 and thus establishes a switchable connection to the intermediate shaft 15 and/or the rotor shaft 11 by means of the switching device 14 and thus a connection between the internal combustion engine 5 and the first electric machine 7. The first gear wheel 16 also meshes with the gear wheel 19. The gear wheel 19 is connected in a rotationally fixed manner to the compressor shaft 21 that drives the air conditioning compressor 20 or is formed integrally with it. The compressor shaft 21 and thus the air conditioning compressor 20 can be fixed to the rotor shaft 10 in an alternative way, for example, arranged coaxially with it, wherein the air conditioning compressor 20 and the second electric machine 6 are arranged axially one behind the other.

In the exemplary embodiment shown, the gear wheel 17 is connected to a planetary gearing 23 by means of an intermediate gear wheel 22. The planetary gearing 23 is further rotationally connected to the second rotor shaft 11. The intermediate gear 22 meshing with the second gear wheel 17 is directly connected in a rotationally fixed manner to a planetary gear carrier 24 of the planetary gearing 23. The planetary gearing 23 of the transmission device 13 also has a sun gear 25, which is directly connected in a rotationally fixed manner to the second rotor shaft 11. Along with the sun gear 25 there are a plurality of planetary gear wheels 26 which are distributed in the circumferential direction and which are rotatably housed on the planetary gear carrier 24, in meshed engagement. A ring gear 27 in meshed engagement with the planetary gear wheels 26 interacts with a brake device 28 fixed to the housing or the vehicle frame, which in its activated state holds the ring gear 27 relative to a vehicle frame and in its deactivated state allows the ring gear 27 to rotate freely relative to the vehicle frame.

Furthermore, in the exemplary embodiment shown the intermediate gear 22 is in meshed engagement with an input wheel 29 of a differential gear 30, which is connected to the drive axles 3, 3a in a rotationally fixed manner. Thus, the torque of the internal combustion engine or the electric machines 6, 7 can be introduced via the intermediate gear 22 and the input gear 29 into the differential gear 30, where it is in turn distributed to the drive axles 3, 3a and thus transmitted to the drive wheels 4, 4a.

The switching device 14 is effectively arranged between the intermediate shaft 15 and the two rotor shafts 10, 11. In a first switching position, the switching device 14 rotationally connects the intermediate shaft 15 with the first rotor shaft 10, while the second rotor shaft 11 is rotationally decoupled from the intermediate shaft 15 and the rotor shaft 10. In a second switching position of the switching device 14, the intermediate shaft 15 is rotationally connected both to the first rotor shaft 10 and to the second rotor shaft 11. In a third switching position of the switching device 14, the two rotor shafts 10, 11 are rotationally connected to one another, while the intermediate shaft 15 is rotationally decoupled from the two rotor shafts 10, 11. In a fourth switching position, the two rotor shafts 10, 11 are rotationally decoupled. In addition, the two rotationally decoupled rotor shafts 10, 11 are also rotationally decoupled from the intermediate shaft 15 in the fourth switching position.

The switching device 14 can be at least partially integrated directly into the first gear wheel 16.

Figure 2:
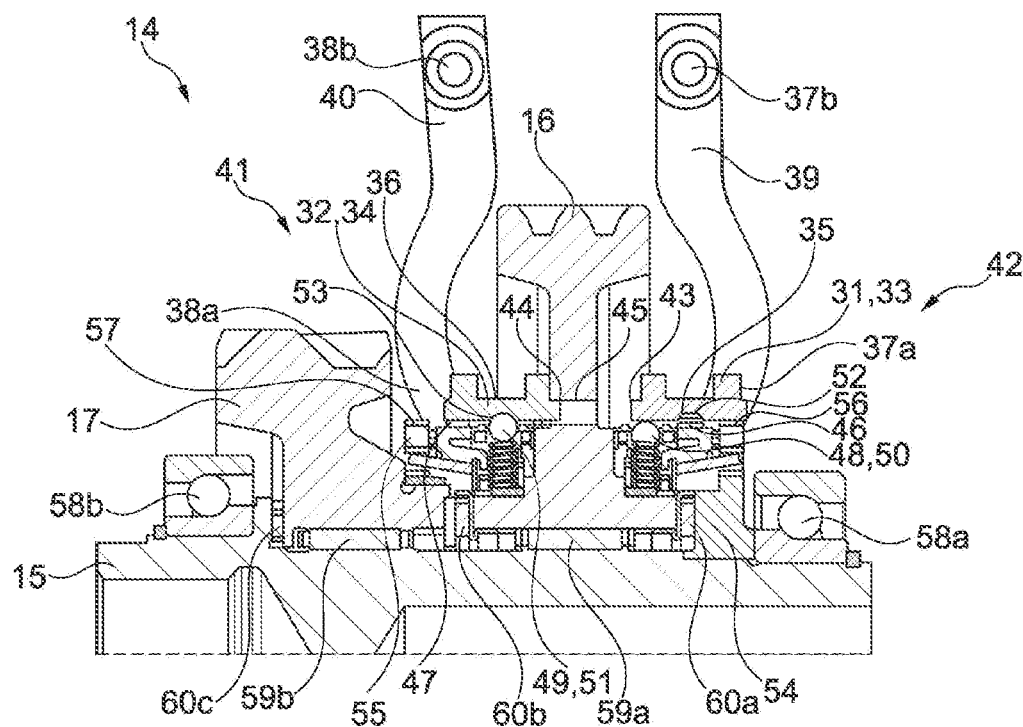
FIG. 2 shows a longitudinal section of a switching device.

FIG. 2 shows the switching device 14 of FIG. 1 in a structural embodiment. This contains sliding sleeves 31, 32, which are housed on the first gear wheel 16 so as to be axially displaceable along the first axis of rotation 8a. By moving the two sliding sleeves 31, 32 into different displacement positions, the switching positions of the switching device 14 required to drive the hybrid powertrain 1 and the air conditioning compressor 20 by means of the internal combustion engine 5 and the electric machines 6, 7 can be set.

For this purpose, the switching device 14 has two synchronizations implemented via the sliding sleeves 31, 32, by means of which different switching positions and thus different operating states of the motor vehicle 2 are set via axial displacement.

The sliding sleeves 31, 32 are designed to be essentially identical and each have an annular base body 33, 34. A circumferential receiving contour 35, 36 is formed on an outer peripheral surface of each of the base bodies 33, 34 which has a U-shaped cross-sectional surface. The receiving contours 35, 36 are designed to receive first ends 37a, 38a of lever elements 39, 40 in a form-fitting manner. Second ends 37b, 38b of the lever elements 39, 40 are each coupled to an actuator, not shown, implemented as a linear motor, so that the sliding sleeves 31, 32 can be adjusted in their displacement positions by means of the actuators. In the exemplary embodiment, each lever element 39, 40 is assigned an actuator. Alternatively, the displacement positions of the two sliding sleeves 31, 32 can be set via a common actuator, wherein, for example, a single actuator is connected at both second ends 37b, 38b of the lever elements 39, 40.

Projection-like engagement sections 43, 44 are formed on the two sliding sleeves 31, 32 on the each of the side surfaces facing the first gear wheel 16. When the sliding sleeves 31, 32 are axially displaced by the actuators in the direction of the first gear wheel 16, depending on the switching positions of the switching device 14 to be set, the engagement sections 43, 44 engage in a through hole 45 formed in the first gear wheel 16. On an inner peripheral surface of the sliding sleeves 31, 32, an internal toothing 46, 47 is formed in each case on the sides facing away from the first gear wheel 16 and are designed as axial teeth/serrations.

In order to support or fix the sliding sleeves 31, 32 in the respective displacement position on the inner peripheral surfaces of the sliding sleeves 31, 32, a locking unit 48, 49 is provided in each case. The locking units 48, 49 are also integrated or supported in the first gear wheel 16. The locking units 48, 49 each have a latching element 50, 51, which are arranged in the first gear wheel 16 so that they can be moved radially and engage with latching contours 52, 53 formed on the inner peripheral surfaces of the sliding sleeves 31, 32 in order to use the latching elements 50, 51 to retain the sliding sleeves 31, 32 in their respective displacement positions in a non-displaceable manner relative to the first gear wheel 16.

The switching device 14 has a substantially annular first transmission element 54 assigned to the first sliding sleeve 31, and a substantially annular second transmission element 55 assigned to the second sliding sleeve 32. The first transmission element 54 is permanently arranged in a rotationally fixed manner on the intermediate shaft 15 and has an external toothing 56 designed as axial teeth on its outer peripheral surface. If, for example as shown in FIG. 2, the first sliding sleeve 31 is displaced by the actuator 41 in the axial direction away from the first gear wheel 16, the internal toothing 46 of the first sliding sleeve 31 is brought into meshed engagement with the external toothing 56 of the first transmission element 54, whereby the intermediate shaft 15 is coupled to the first gear wheel 16 in a rotationally fixed manner.

The second transmission element 55 is permanently arranged in a rotationally fixed manner on the second gear wheel 17. Analogously to the first transmission element 54, the second transmission element 55 also has an external toothing 57 designed as axial teeth on its outer peripheral surface. The external toothing 57 can be used for coupling of the first gear 16 to the second gear 17 in a rotationally fixed manner by displacing the second sliding sleeve 32 by means of the actuator 42 into meshed engagement with the internal teeth 47 of the second sliding sleeve 32.

The intermediate shaft 15 is mounted in relation to a housing of the hybrid powertrain 1 by means of the support bearings 58a, 58b designed as angular ball bearings. The two first and second gear wheels 16, 17 are mounted on the outside of the intermediate shaft 15 via radial bearings 59a, 59b designed as needle bearings so that they can rotate relative to one another. In order to enable relative rotational movements between the first gear wheel 16, the second gear wheel 17 and the intermediate shaft 15 in a decoupled state, axial bearings 60a. 60b, 60c designed as needle bearings are also arranged between axial abutment surfaces, wherein the axial bearing 60a enables the relative rotational movement between the intermediate shaft 15, in particular the first transmission element 54, and the first gear wheel 16, the axial bearing 60b enables the relative rotational movement between the first gear wheel 16 and the second gear wheel 17 and the axial bearing 60c enables the relative rotational movement between the second gear wheel 17 and the intermediate shaft 15.

The switching device 14 here forms two clutches 41, 42 for example switching clutches, wherein the connection of the internal combustion engine 5 and the electric machine 6, 7 (cf. FIG. 1) is determined by their switching.

The function of the clutches 41, 42 is described in more detail below;

FIG. 2 shows the switching device 14 in the first switching position, i.e., with the first clutch 41 open and the second clutch 42 closed. The sliding sleeve 31 is shifted in the direction away from the first gear wheel 16 so that the internal toothing 46 of the first sliding sleeve 31 is in meshed engagement with the external toothing 56 of the first transmission element 54. Thus, in the first switching position, the intermediate shaft 15 and the first gear 16 are coupled in a rotationally fixed manner. The second sliding sleeve 32 is in a position facing the gear wheel 16, in which the engagement section 44 engages in the through hole 45 and the internal toothing 47 is therefore not in meshed engagement with the external toothing 57 of the second transmission element 55. This means that in the first switching position the first gear 16 and the second gear 17 are rotationally decoupled from one other. The latching element 51 is latched in the latching contour 53 and thus holds the second sliding sleeve 32 in the position facing the gear wheel 16. Due to the rotationally fixed coupling of the intermediate shaft 15 and the first gear 16, the internal combustion engine 5 is operatively connected in a rotationally fixed manner to the second electric machine 6 in the first switching position, thereby switching to a serial operating mode. In this serial operating mode, the internal combustion engine 5 drives the second electric machine 6, wherein the second electric machine 6 supplies the electric machine 7 with electric energy, possibly temporarily stores the electric energy generated in this way in an accumulator or an electric battery, which drives the motor vehicle purely electrically. In this operating state, the air conditioning compressor 20 (cf. FIG. 1) is driven by the internal combustion engine 5 via the gear wheel 16.

In addition to the serial operating mode, a purely electric operating mode, a starting mode of the internal combustion engine, a stationary charging mode, an operating mode for purely electric reversing and an energy recovery mode can also be provided in the first switching position.

By displacing the switching sleeves 31, 32, the other switching states of the switching device 14 are set accordingly.

Figure 3:
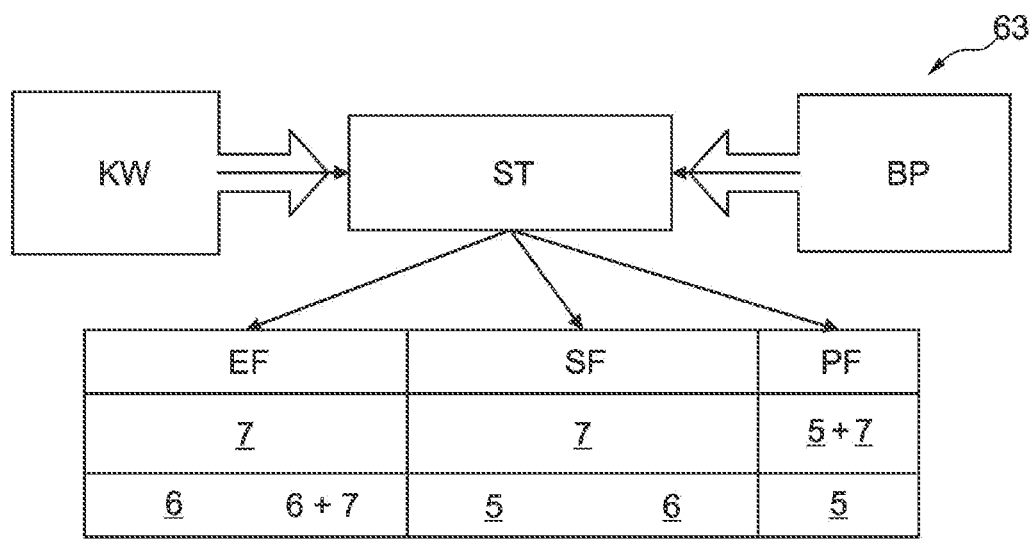
FIG. 3 shows a functional diagram for the operation of the hybrid powertrain of FIG. 1.

FIG. 3 shows the operation of the hybrid powertrain 1 of FIG. 1 based on the block diagram 63 using the reference symbols of the hybrid powertrain 1 of FIG. 1.

The control unit ST sets the operating modes depending on the desired air conditioning KW selected by the driver or the occupants of the motor vehicle and depending on the operating parameters BP of the motor vehicle, for example the outside temperature, the inside temperature of the passenger compartment, the vehicle speed, the battery charge level, the position of the accelerator pedal and the like.

In the first operating mode "Electric driving" EF, the motor vehicle 2 is operated exclusively electrically by means of the first electric machine 7. The air conditioning compressor 20 is driven by means of the second electric machine 6 and/or by means of both electric machines 6, 7.

In the second operating mode "Serial driving" SF, the motor vehicle 2 is driven purely electrically by means of the first electric machine 7. The internal combustion engine 5 drives the electric machine 6 as a generator. The air conditioning compressor 20 is driven by the electric machine 6 or by the internal combustion engine 5.

In the third operating mode "Parallel driving", the motor vehicle 2 is driven in a hybrid manner by means of the internal combustion engine 5 and the electric machine 7. The air conditioning compressor 20 is driven by means of the internal combustion engine 5, which can optionally drive the electric machine 6 switched to operate as a generator. In a boost mode, the electric machine 6 can also be switched to operate as a motor and the air conditioning compressor 20 can be switched off.

Figure 4:
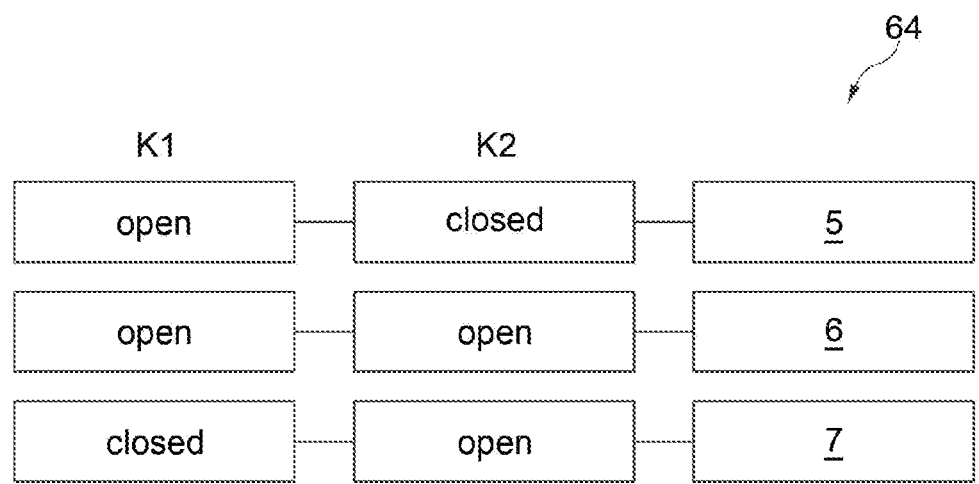
FIG. 4 shows a state diagram of the switching device from FIG. 2.

FIG. 4 shows a circuit diagram 64 of the wiring of the switching device 14 of FIGS. 1 and 2 for setting the operation of the air conditioning compressor 20 of FIG. 1.

If clutch K1, corresponding to reference symbol 41 in FIG. 2, is open and clutch K2, corresponding to reference symbol 42 in FIG. 2, is closed, the internal combustion engine 5 drives the air conditioning compressor 20.

If both clutches K1, K2 are open, the electric machine 6 drives the air conditioning compressor 20.

If clutch K1 is open and clutch K2 is closed, the electric machine 7 drives the air conditioning compressor 20.

LIST OF REFERENCE SYMBOLS

1 Hybrid powertrain
2 Motor vehicle
3, 3a Drive axle
4, 4a Drive wheel
5 Internal combustion engine
6 Electric machine
7 Electric machine
8a, 8b, 8c Axis of rotation
9 Output shaft
10 Rotor shaft
11 Rotor shaft
12 Drive section
13 Transmission device
14 Switching device
15 Intermediate shaft
16 Gear wheel
17 Gear wheel
18 Gear wheel
19 Gear wheel
20 Air conditioning compressor
21 Compressor shaft
22 Intermediate gear wheel
23 Planetary gearing
24 Planetary gear carrier
25 Sun gear
26 Planetary gear wheel
27 Ring gear
28 Braking device
29 Input wheel
30 Differential transmission
31 First sliding sleeve
32 Second sliding sleeve
33, 34 Base body
35, 36 Receiving contour
37a, 38a End
37b, 38b End
39, 40 Lever element
41, 42 Clutch
43, 44 Engaging section
45 Through hole
46, 47 Internal toothing
48, 49 Locking element
50, 51 Latching element
52, 53 Latching contour
54 Transmission element
55 Transmission element
56, 57 External toothing
58a, 58b Support bearing
59a, 59b Radial bearing
60a, 60b, 60c Axial bearing
63 Block diagram
64 Circuit diagram
BP Operating parameters
EF Electric driving
KW Desired air conditioning
PF Parallel driving
SF Serial driving
ST Control unit

The invention claimed is:

1. A method for controlling an air conditioning compressor in a hybrid powertrain of a motor vehicle, the hybrid powertrain including an internal combustion engine, a first electric machine, and a second electric machine, the electric machines and the internal combustion engine being selectively connectable to the air conditioning compressor so as to function as a drive of the air conditioning compressor, the method comprising:
 selecting at least one of the first electric machine, the second electric machine, or the internal combustion engine as the drive based on an air conditioning selection by an occupant of the motor vehicle; and
 actuating the selected drive to drive the air conditioning compressor, wherein, when a load requirement on the hybrid powertrain exceeds a predetermined threshold, the air conditioning compressor is switched off for a duration of the load requirement.

2. The method according to claim 1, further comprising selecting the drive additionally based on an operating mode of the hybrid powertrain.

3. The method according to claim 2, wherein, when the hybrid powertrain is operated exclusively electrically, at least one of the first or second electric machine serves to drive the air conditioning compressor.

4. The method according to claim 1, further comprising, selecting the drive based additionally on a load requirement on the hybrid powertrain.

5. The method according to claim 1, wherein the air conditioning compressor is switched off when a malfunction of the air conditioning compressor is determined.

6. The method according to claim 5, wherein the malfunction is determined based on a pressure applied to the air conditioning compressor.

7. The method according to claim 5, wherein the malfunction is determined by comparing a torque of the hybrid powertrain with a coupled air conditioning compressor to a torque of the hybrid powertrain without a coupled air conditioning compressor.

8. The method according to claim 1, wherein the second electric machine is operated as a generator.

9. The method according to claim 2, wherein, when the hybrid powertrain is operated exclusively electrically, the first electric machine and the air conditioning compressor are decoupled from the hybrid powertrain, and the first electric machine is used exclusively to drive the air conditioning compressor.

10. The method according to claim 9, wherein a rotational speed of the air conditioning compressor is determined based on a speed of drive wheels of the motor vehicle.

11. The method according to claim 1, wherein a rotational speed of the air conditioning compressor is determined independently of a speed of drive wheels of the motor vehicle.

12. The method according to claim 1, further comprising selecting the drive based additionally on operating points of characteristic curves for at least one of the electric machines or the air conditioning compressor.

13. The method according to claim 1, further comprising actuating a clutch to connect the air conditioning compressor to the selected drive.

14. A hybrid powertrain, comprising:
an internal combustion engine;
a first electric machine;
a second electric machine;
an air conditioning compressor connected to the second electric machine in a rotationally locked manner;
a switching device designed to selectively engage a drive for the air conditioning compressor, wherein the drive includes at least one of the first electric machine, the second electric machine, or the internal combustion engine; and
a control unit programmed to:
select the drive for the air conditioning compressor based on an operating mode of the hybrid powertrain;
actuate the switching device to engage the selected drive; and
actuate the selected drive to drive the air conditioning compressor, wherein, when a load requirement on the hybrid powertrain exceeds a predetermined threshold, the air conditioning compressor is switched off for a duration of the load requirement.

15. The hybrid powertrain according to claim 14, wherein the control unit is further programmed to select the drive based additionally on operating points of characteristic curves for at least one of the electric machines or the air conditioning compressor.

16. The hybrid powertrain according to claim 14, wherein the control unit is further programmed to select the drive based additionally on a load requirement on the hybrid powertrain.

17. A hybrid powertrain, comprising:
an internal combustion engine;
a first electric machine;
a second electric machine;
an air conditioning compressor; and
a clutch engaged with the internal combustion engine, the first electric machine, and the second electric machine, the clutch being designed to selectively engage a drive of the air conditioning compressor;
wherein the drive includes at least one of the first electric machine, the second electric machine, or the internal combustion engine; and
wherein, when a load requirement on the hybrid powertrain exceeds a predetermined threshold, the air conditioning compressor is switched off for a duration of the load requirement.

18. The hybrid powertrain according to claim 17, wherein the air conditioning compressor is connected to the second electric machine in a rotationally locked manner.

\* \* \* \* \*